Jan. 21, 1941.  L. ERICKSON  2,229,409
LOADER
Filed Feb. 9, 1939  3 Sheets-Sheet 1

Inventor
L. Erickson
by
Attorney

Patented Jan. 21, 1941

2,229,409

UNITED STATES PATENT OFFICE 2,229,409

LOADER

Leif Erickson, Tower City, N. Dak., assignor to Allis-Chalmers Manufacturing Company, Milwaukee, Wis., a corporation of Delaware Application February 9, 1939, Serial No. 255,428

8 Claims. (Cl. 214—140)

This invention relates to tractor mounted loading devices, and it is concerned more specifically with a tractor mounted sweep rake stacker.

It is an object of the invention to provide an attachment of this kind which comprises a frame and a vertically swingable lifting element, and which may be mounted on and removed from the tractor as a unit. In this connection, it is a further object of the invention to utilize the vertically swingable lifting element of the attachment in conjunction with other supporting means for holding the frame of the attachment in substantially the same elevated position above the ground which said frame occupies when mounted on the tractor. The frame construction is preferably such that the tractor may be driven into the frame and removed from the frame while it is held in the mentioned elevated position above the ground, and in this manner the work of mounting the attachment on the tractor and removing it therefrom is intended to be substantially facilitated.

Another object of the invention is to provide an improved sweep rake stacker attachment for a tractor, which affords a high lift of the rake head or other gathering element, so that a stack of substantial height may be built up.

A further object of the invention is to provide equipment of the mentioned character which is simple and compact in construction, efficient in operation and which may be manufactured at low cost.

The foregoing and other objects and advantages of the invention will be apparent from the following description of a preferred embodiment of the invention. Referring to the accompanying drawings, in which like reference characters designate the same or similar parts in the various views, Fig. 1 is a side view of a tractor mounted sweep rake stacker;

Figure 1:
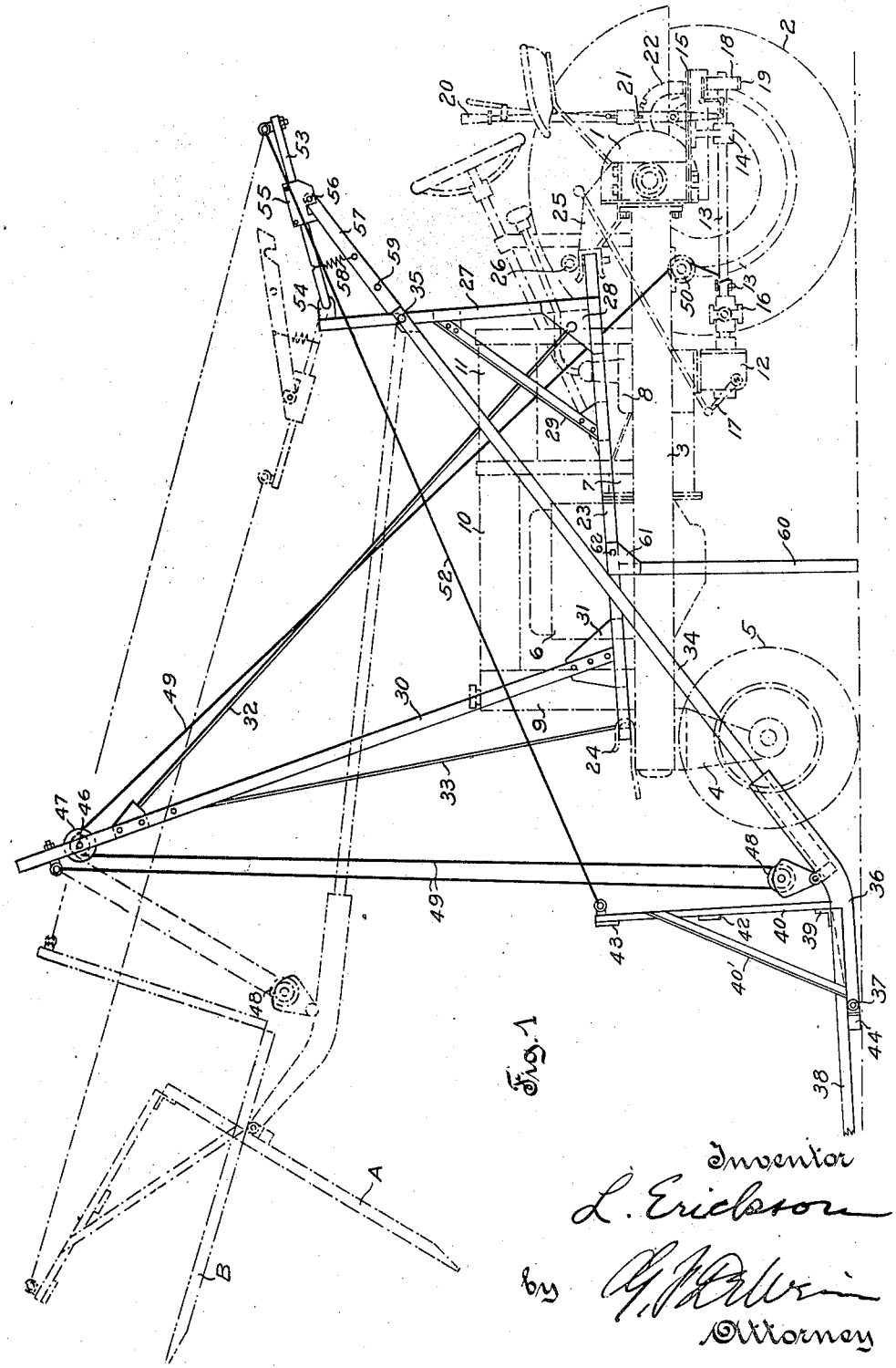
Figure 2:
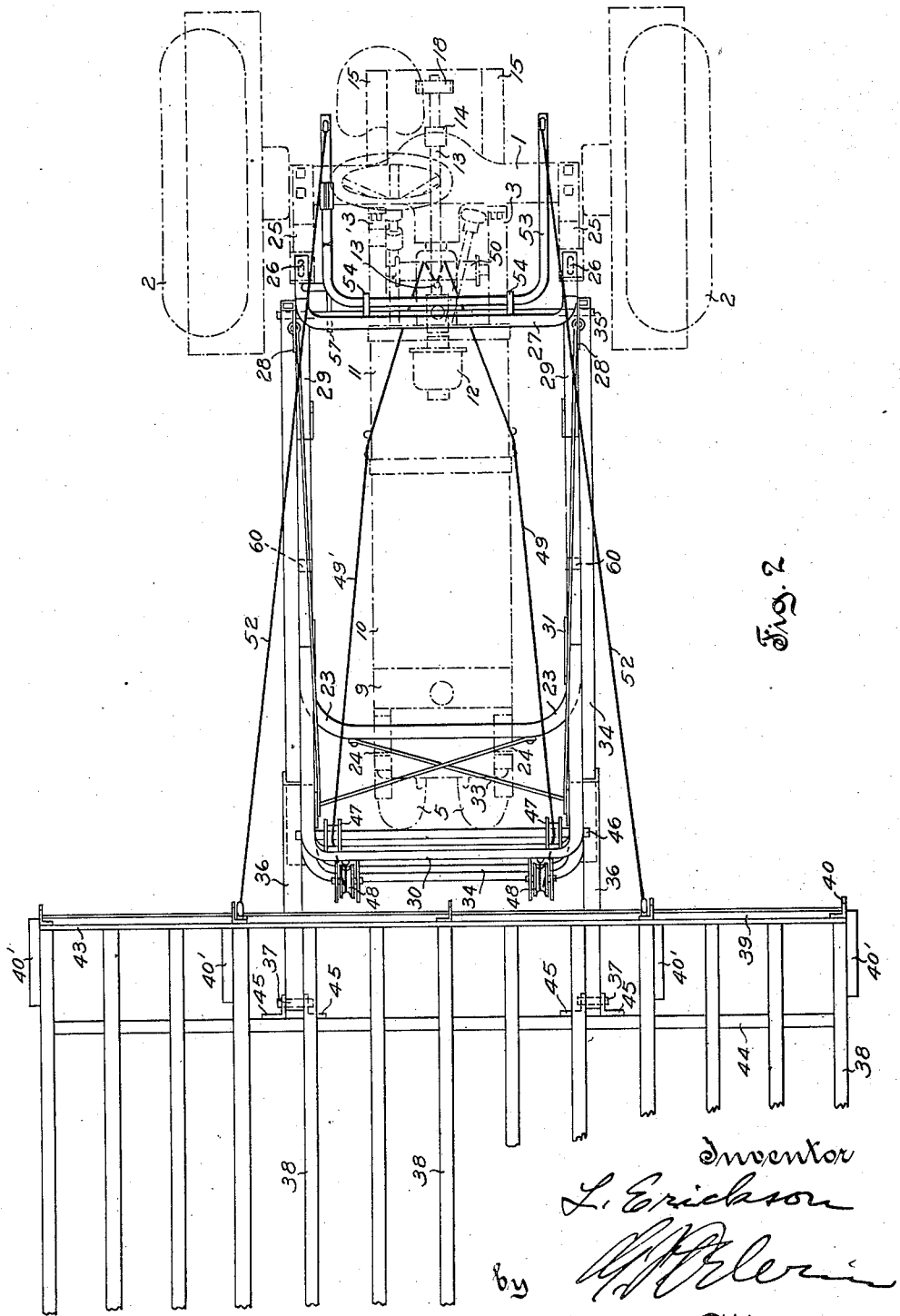
Fig. 2 is a top view of the machine shown in Fig. 1.
Figure 3:
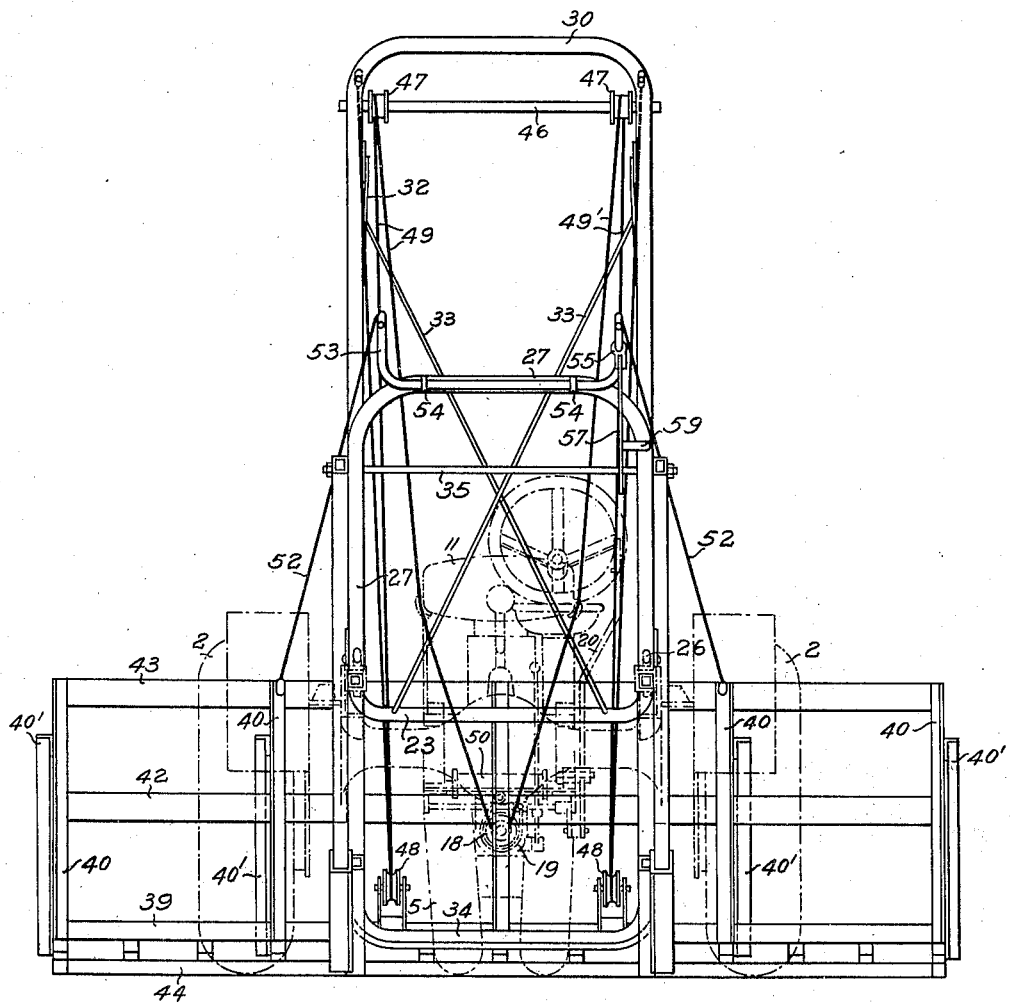
Fig. 3 is a rear view of the machine shown in Fig. 1.

Referring to Figs. 1, 2 and 3 of the drawings, a standard farm tractor is shown in dotted lines. As best shown in Fig. 2, the tractor comprises a rear axle housing 1 supported on a pair of transversely spaced rear traction wheels 2. Secured to the rear axle housing 1 are forwardly extending side channels 3, the front ends of which are secured to the housing 4 of a front steering truck supported on a pair of front wheels 5.

A power plant, including a motor 6, clutch mechanism 7, and transmission mechanism 8 are mounted between the side channels 3; and a radiator 9, hood 10, and fuel tank 11 are mounted on the side channels 3. For a fuller disclosure of the tractor shown herein, reference is made to United States Patent 2,073,613, March 16, 1937, C. E. Frudden and W. F. Strehlow, Motor vehicle.

Power for driving a hoist shaft 13 is derived from the motor 6 by means of a power take-off mechanism 12 which is secured to the under side of the transmission mechanism 8. A universal joint 16 connects the hoist shaft 13 with a stub shaft projecting from the housing of the power take-off mechanism, and a throw-out lever 17 may be manipulated by means of a shift rod to establish or disconnect the drive to the stub shaft of the power take-off mechanism and to the hoist shaft 13. The hoist shaft is journaled at its rear in a bearing 14 secured to the rear platform 15 of the tractor. Secured to the rear of the shaft 13 is a brake drum 18 which is surrounded by a brake band 19 operably connected to a brake lever 20. The lever 20 is pivotally mounted on the rear platform 15 of the tractor and is held in position by a dog 21 which engages with a ratchet 22 also mounted on the platform 15. The dog 21 may be disengaged from the ratchet 22 by manipulation of a pivoted handle on the lever 20 in the usual manner.

The reference numeral 23 designates a U-shaped frame base having side beams extending longitudinally of the tractor at opposite sides thereof, and the closed end of the frame being positioned in front of the radiator 9. Mounted on top of the housing 4 of the front steering truck and fixedly secured thereto are two U-shaped mounting brackets 24, designed to guide the transverse portion of the U-shaped frame base 23 into engagement with the bight of said mounting brackets 24 during attachment of the loading device to the tractor, and to retain the front end of the frame base 23 on the tractor against upward movement.

Fixedly secured to the rear axle housing 1 of the tractor are two mounting brackets 25, one at each side of the tractor, as best shown in Fig. 2, each bracket 25 having a horizontally directed socket portion open at the forward end. The brackets 25 are designed to receive the rear ends of the frame base 23 which are retained therein by means of pins 26, the pins passing through the brackets 25 and through the rear ends of the frame base 23.

Rigidly mounted on the frame base 23 near its rearward end is a U-shaped post structure or arch 27 having side legs secured at their lower ends to the side beams of the frame base 23 by means of gusset plates 28. Braces 29 are connected at their opposite ends to the side legs of the arch 27 and to the side beams of the frame base 23. Also mounted on the frame base 23, forwardly of the rear arch 27, is another U-shaped post structure or forward arch 30 having side legs secured at their lower ends to the side beams of the frame base 23 by means of gusset plates 31. Two parallel guys 32, spaced transversely of the tractor, are connected at their upper ends to the side legs of the forward arch 30 and are anchored at their lower ends to the gusset plates 28. The forward arch 30 is further braced by crossed front brace members 33 connected at their upper ends to the side legs of the arch 30 and at their lower ends to the forward transverse portion of the frame base 23. It should be noted that the side legs of the frame base 23 and the side legs of the arches 27 and 30 are spaced farther apart, transversely of the tractor, than the side channels 3 of the tractor, and that when the attachment is mounted on the tractor as shown in Fig. 1, the tractor occupies an unobstructed space between the side legs of the frame base 23 and between the side legs of the arches 27 and 30. The guys 32 do not touch the tractor nor do the crossed front brace members 33 engage the brackets 24 which are secured to the tractor.

A U-shaped dipper frame, designated by the reference character 34, has side arms extending longitudinally of the tractor at opposite sides thereof, and a transverse front portion in advance of the tractor. The dipper frame 34 is pivotally mounted on the rear arch 27 by means of a transverse shaft 35 which extends through the side legs of the arch 27 and through the side arms of the dipper frame at their rear ends, the shaft 35 being positioned on a level substantially above the level of the frame base 23. Arm extensions 36 are secured to the side arms of the dipper frame 34, each arm extension 36 having a rearward leg extending longitudinally of and secured to the respective side arm of the frame 34 and a forward leg extending at an obtuse angle from the rearward leg. The obtuse angle between the legs of the arm extensions 36 is such as to position the forward leg of each arm extension in substantial parallelism with the ground when the dipper frame 34 is in lowered position as shown in full lines in Fig. 1.

A rake head to be pushed by the tractor and to be raised and lowered by the dipper frame 34 is pivotally mounted on the forwardly extending legs of the arm extensions 36. The rake head comprises the usual platform consisting of tines 38 which are secured to a transverse tubular bar 44, and brackets 45 secured to the bar 44 are pivotally connected with the forward ends of the arm extensions 36 by horizontally and transversely extending bolts 37, as best shown in Fig. 2. The rear ends of the tines 38 are connected by a transverse angle iron 39 to which are secured upstanding fence posts 40, the fence posts being connected intermediate their ends by a transverse fence board 42 and at their upper ends by another transverse fence board 43. The fence formed by the fence posts 40 and boards 42 and 43 is secured in right angle position relative to the tines 38 by four braces 40' as shown in Figs. 1 and 2. The pivotal connections between the rake head and the arm extensions 36 permit tilting of the rake head about the transverse common axis of the bolts 37, and the rake head has a tendency to tip forwardly about said axis as shown in dash-dotted lines at A in Fig. 1, the center of gravity of the rake head lying ahead of the axis of the bolts 37. Rearward tilting of the rake head is limited by engagement of the angle iron 39 with the arm extensions 36.

A hoisting tackle for raising the dipper frame 34 about its pivotal connections with the arch 27 is provided as follows. As shown in Figs. 2 and 3, a transverse pulley shaft 46 is mounted on the forward arch 30 near the upper end thereof and carries two pulleys 47, one adjacent to each side leg of the arch 30. Another pair of pulleys 48 is mounted on the transverse member of the dipper frame 34, the pulleys 48 being spaced transversely as shown in Fig. 2. Trained over the pulleys 47 and 48 at one side of the attachment is a cable 49 which is anchored at one end to the arch 30 above the pulley shaft 46 and in proximity to the pulley 47 at the mentioned side of the attachment. Another cable 49' anchored at one end to the arch 30 is trained over the pulleys 48 and 47 at the other side of the attachment, the arrangement of the cable 49' corresponding to the arrangement of the cable 49 so that lifting power may be applied to both sides of the dipper frame 34 by exerting pull on both cables simultaneously. From the pulleys 47 the cables 49 and 49' pass rearwardly and downwardly along opposite sides of the fuel tank 11 over a transverse roller 50 on the tractor to the wind shaft 13, the cables being detachably secured to the wind shaft 13 by means of a bolt 13'. In order to raise the dipper frame 34 from the position in which it is shown in full lines in Fig. 1, an operator on the tractor manipulates the push rod for the throw-out lever 17 so as to establish driving connection from the motor 6 to the hoist shaft 13, and the cables 49 and 49' will then be wound around the shaft 13 due to the rotation of said shaft in one direction. Rotation of the shaft 13 by motor power will not be impeded by the brake band 19 if the hand lever 20 is set to an inoperative position, but after the dipper frame has been raised to the desired height the throw-out lever 17 and the brake lever 20 are manipulated simultaneously to disconnect the drive from the shaft 13 and to lock said shaft against rotation by tightening the brake band 19 around the brake drum 18. The locking of the shaft 13 will prevent downward movement of the dipper frame, and when it is desired to lower the dipper frame it is merely necessary to loosen the brake by manipulation of the brake lever 20. The raised position of the dipper frame 34 indicated in dotted lines in Fig. 1 is an intermediate position, and it will be seen that the dipper frame may be raised to a position in which the pulleys 48 come closer to the top of the arch 30 than shown in Fig. 1.

Since the rake head is pivoted on the arm extensions 36 of the dipper frame and has a tendency to tip forwardly, as has been explained hereinbefore, it is necessary to hold the rake head against forward tipping during up and down movements of the dipper frame, so that a load on the rake head may be lifted, and after discharge of the load the rake head may be brought clear down again into the position in which it is shown in full lines in Fig. 1. The mechanism for controlling the position of the rake head relative to the dipper frame comprises a U-shaped bail 53 which is pivotally mounted in brackets 54 on the upper part of the rear arch 27 for swinging movement about a transverse axis. Secured to the arms of the bail 53 at the free ends thereof, are two cables 52 which extend divergently towards the rake head and are secured to the rear thereof at transversely spaced points outside of the cables 49 and 49'. As shown in Fig. 3, the cables 52 are connected with the upper ends of two of the fence posts 40, these posts being preferably braced by braces 40' as shown in Figs. 1 and 3. A bracket 55 on one of the arms of the bail 53 has a pivot pin 56 for a latch 57 which latch hooks under the transverse shaft 35 of the rear arch 27, as shown in Fig. 1. A spring 58 between the latch 57 and the bail 53 pulls the latch into engagement with the shaft 35, and a handle 59 is secured to the latch for pulling it out of engagement with the shaft 35. When the latch is hooked under the shaft 35 and the dipper frame 34 is swung upwardly from the full line position shown in Fig. 1, the upper edge of the fence of the rake head is held equidistant from the free ends of the bail 53 by the cables 52, while the pivot axis of the rake head at 37 moves on a circle about the axis of the transverse shaft 35. Due to this arrangement the rake head will pivot about the bolts 37 during upward movement of the dipper frame 34, and as the rake head moves upward the angular relation of its platform to the ground changes but little and the platform remains substantially level, there being only a slight backward tilting of the rake head relative to the horizontal during its upward movement, as indicated at B in Fig. 1. When the rake head has been raised to the desired height, the operator pulls the latch 57 out of engagement with the shaft 35, whereupon the rake head will tip forwardly about its pivotal connections with the dipper frame 34, as shown in dash-dotted lines at A in Fig. 1, and a load on the rake head will be dumped. Forward tipping of the rake head pulls the bail 53 into the dash-dotted line position shown in Fig. 1, and it will be noted that the latch extends at an angle from the bail suitable to reengage the shaft 35 when the bail 53 is swung back by the operator in order to restore the rake head to its load carrying position. The bracket 55 has a suitable stop against which the latch 57 is pulled by the spring 58 when the bail 53 occupies the dash-dotted line position shown in Fig. 1.

In operation, the tractor and the entire loading attachment which is mounted thereon are moved about by driving the tractor in the ordinary manner, and the weight of the attachment is borne at the front and rear of the tractor by means of the base frame 23. In order to disconnect the attachment from the tractor, dipper frame 34 is first lowered into ground engaging position as shown in full lines in Fig. 1. The cables 49 and 49' are disconnected from the hoist shaft 13 by removal of the bolt 13', and the free ends of the cables are moved out of the way so as not to become entangled with the tractor when the latter is backed out of the attachment. After the cables 49 and 49' have been disconnected and moved out of the way, all that remains to be done is to place a prop indicated by 60 in Fig. 1 under each side leg of the base frame 23, and to remove the pins 26, whereupon the tractor can be driven rearwardly out of the attachment and the latter will remain standing on the ground as a self-supporting unit in substantially the same position in which it is shown in Fig. 1.

In order to retain the attachment in the mentioned position without relying for support upon the tractor, the props 60 are arranged at such a distance from the forward or rearward end of the base frame 23 that the tendency of the entire attachment frame to tip forwardly about the pivotal support afforded by the props will be nearly equal to the tendency of the frame to tip rearwardly, while the forward end of the dipper frame 34 rests on the ground. It should be noted that the attachment frame is subject to rearward tilting not only due to the weight of its parts which overhang the props rearwardly, such as the rearward portions of the base frame 23, the arch 27, the braces 29, and due to the weight of the shaft 35 and the bail 53 which are mounted on the arch 27, but also due to the weight component of the dipper frame 34 which is imposed upon the attachment frame at the shaft 35 while the forward end of the dipper frame rests on the ground. On the other hand, the attachment frame is subject to forward tilting due to the weight of its parts which overhang the props 60 forwardly, including the forward portion of the base frame 23, the forward arch 30, the braces 33, and due to the weight of the forward parts of the hoisting mechanism such as the shaft 46 and the pulleys 47. As shown in Fig. 1, the props 60 and the attachment frame are arranged in such relation to each other that the weight component of the frame at the rear end thereof, which tends to tilt the frame rearwardly and the mentioned weight component of the dipper frame 34 which also tends to tilt the frame rearwardly while the dipper frame rests on the ground, are substantially counterbalanced by the weight component of the frame at the forward end thereof which tends to tilt the attachment frame forwardly. Or stated differently, in the arrangement of the parts as shown in Fig. 1 the weight of the attachment frame and of the parts of the hoisting mechanism mounted thereon is so distributed relative to the tilting support afforded by the props that the frame, in its elevated position, is forwardly overbalanced substantially to the extent of the weight imposed upon its rear by the dipper frame while the forward end of the dipper frame rests on the ground.

Each prop 60 consists preferably of a piece of square steel tubing which, at its lower end, rests on the ground, and the upper end of which bears against the lower side of the respective side leg of the base frame 23. In order to stabilize the props 60 on the base frame 23, a pair of plates 61 are secured to each prop tube to receive the respective side leg of the base frame between them, and the plates are connected with the respective side leg for pivotal movement relative thereto about a transverse horizontal axis 62. The axis 62 is offset from the center line of the prop tube towards the rear, so that each prop will have a forward load bearing contact with the base frame 23 at the upper forward edge of the prop tube, and a rearward load bearing contact at the respective pivot axis 62. The base frame 23 therefore cannot pivot about the upper ends of the props in a forward direction. Forward tipping of the frame 23 could only take place about the lower ends of the props 60 but such forward tipping is effectively prevented by the dipper frame 34 whose forward end cannot easily be pushed forward on the ground. Preferably the arrangement of the props 60 on the base frame 23 is such that when the props are set up as shown in Fig. 1 the entire attachment frame has a slight but definite tendency to tip forwardly about the lower ends of the props, which tendency, however, is counteracted by the dipper frame 34, and the entire attachment will therefore rest stably on the ground in the position in which it is shown in Fig. 1 without reliance upon the tractor for support.

While the attachment is standing on the ground as a self-supporting unit, as explained in the foregoing paragraph, the tractor can be driven into it from the rear, it being only necessary for the driver of the tractor to watch the front brackets 24 and the rear brackets 25 for proper engagement with the base frame 23. After the tractor has been driven into the attachment, the pins 26 are dropped into place, the cables 49 and 49' are connected to the hoist shaft, and the props 60 are moved out of the way, preferably by folding them up alongside the side legs of the base frame 23. The attachment is then ready for operation.

It should be noted that the attachment may be mounted on and dismounted from the tractor as a unit and that it lends itself to convenient and quick handling by one man. The dipper frame has a comparatively wide range of vertical movement, which makes it possible to either dump a load from the rake head onto a farm wagon or to build up a stack, for instance a hay stack, of considerable height.

While in the foregoing a preferred embodiment of the invention has been described, it should be understood that it is not intended to limit the invention to the exact details of construction herein shown and described, for various modifications within the scope of the claims may occur to persons skilled in the art.

It is claimed and desired to secure by Letters Patent:

1. In combination, a frame adapted to be sustained by a tractor in an elevated position above the ground, a rigid arm pivotally mounted on said frame for swinging movement relative thereto in a vertical plane and having an end portion adapted to rest on the ground while said frame is being sustained in said elevated position by said tractor, and a prop structure, including ground engaging portions spaced transversely of said plane, cooperating with said frame to support the latter for tilting movements from said elevated position in opposite directions longitudinally of said plane and to maintain said frame, in said elevated position thereof, against tilting movements transversely of said plane, said prop structure and frame being arranged in such relation to each other that the weight component of said frame at one end thereof which tends to tilt said frame in one of said directions, and any weight component of said arm which tends to tilt said frame in said one direction while said end portion of said arm rests on the ground, are substantially counterbalanced by the weight component of said frame at the other end thereof which tends to tilt said frame in the other of said directions.

2. In combination, a frame having forward and rearward portions engageable, respectively, with forward and rearward portions of a tractor for sustaining said frame in an elevated position above the ground, a prop structure, including ground engaging portions spaced transversely of said tractor, cooperating with portions of said frame intermediate the forward and rearward ends thereof to support said frame for forward and rearward tilting movements from said elevated position and to maintain said frame, in said elevated position thereof, against tilting movements transversely of said tractor, pivot means on said frame adjacent to one end thereof, and a rigid arm having one end connected with said frame by said pivot means for swinging movement of said arm in a vertical plane extending longitudinally of said frame, the other end of said arm being adapted to rest on the ground at the side of said prop structure remote from said pivot means while said frame is being sustained in said elevated position, and the weight of said frame being distributed relative to the tilting support afforded by said prop structure in such a manner that said frame, in said elevated position thereof, is overbalanced at the side of said prop structure remote from said pivot means, substantially to the extent of the weight imposed upon said frame at said pivot means by said arm while said other end of said arm rests on the ground.

3. In combination, a frame having forward and rearward portions engageable, respectively, with forward and rearward portions of a tractor for sustaining said frame in an elevated position above the ground, a prop structure supported at lower portions thereof, spaced transversely of said tractor, for forward and rearward tilting movements relative to the ground, means on said prop structure supportingly engaging said frame intermediate the forward and rear ends of the latter and cooperating with said frame to restrain it from tilting relative to said prop structure transversely and longitudinally of said tractor, pivot means on said frame adjacent to the rear end thereof, and a rigid arm having one end connected with said frame by said pivot means for swinging movement of said arm in a vertical plane extending longitudinally of said frame, the other end of said arm being adapted to rest on the ground forwardly of said prop structure while said frame is being sustained in said elevated position, and the weight of said frame being distributed relative to the tilting support afforded by said prop structure in such a manner that said frame, in said elevated position thereof, is forwardly overbalanced substantially to the extent of the weight imposed upon its rear by said arm while said other end of said arm rests on the ground.

4. In a loader attachment for tractors, a frame comprising side members adapted to extend longitudinally of a tractor at opposite sides thereof, and an upwardly extending arch connecting said side members at the rear of said frame, said frame having forward and rearward end portions engageable, respectively, with forward and rearward portions of the tractor for sustaining said frame in an elevated position above the ground; a pair of ground-engaging props, one under each of said side members, supporting said frame for forward and rearward tilting movements from said elevated position; and a dipper having rigid side arms at opposite sides of said frame pivotally connected with an upper portion of said arch on a horizontal axis extending transversely of said side members, the forward end of said dipper being adapted to rest on the ground forwardly of said frame while said frame is being sustained in said elevated position; and the weight of said frame being distributed relative to the tilting support afforded by said props in such a manner that said frame, in said elevated position thereof, is forwardly overbalanced substantially to the extent of the weight imposed upon its rear by said dipper while said forward end of said dipper rests on the ground.

5. In a loader attachment for tractors, a frame comprising side members adapted to extend longitudinally of a tractor at opposite sides thereof, an upwardly extending arch connecting said side members at the rear of said frame, and a post structure extending upwardly from said side members at the front of said frame, said frame having forward and rearward end portions engageable, respectively, with forward and rearward portions of the tractor for sustaining said frame in an elevated position above the ground; a dipper having rigid side arms at opposite sides of said frame pivotally connected with an upper portion of said arch on a horizontal axis extending transversely of said side members, hoisting means mounted on said frame including a cable support at the upper end of said post structure and a cable trained over said support and connected with said dipper for raising and lowering said dipper, the forward end of said dipper being adapted to rest on the ground forwardly of said frame while said frame is being sustained in said elevated position; and a pair of ground-engaging props, one under each of said side members, supporting said frame for forward and rearward tilting movements from said elevated position; the weight of said frame and of said hoisting means being so distributed relative to the tilting support afforded by said props that said frame, in said elevated position thereof, is forwardly overbalanced substantially to the extent of the weight imposed upon its rear by said dipper while said forward end of said dipper rests on the ground.

6. The combination of a tractor having a body supported on front and rear wheels, and a loading attachment comprising a frame having relatively spaced side members extending longitudinally of said tractor at opposite sides of said body to permit movement of said tractor forwardly into and rearwardly out of the space between said side members, means at the forward ends of said side members supportingly engageable with forward portions of said tractor by said forward movement of the latter to support said side members forwardly on said tractor, the rear ends of said side members bearing upon rearward portions of said tractor and being slidable thereon to permit supporting engagement of said tractor with said rear ends of said side members, by said forward movement of the tractor, an upwardly extending arch connecting said side members at the rear of said frame and being of sufficient height to permit unobstructed passage of said tractor into and out of the space between said side members, a dipper having side arms at opposite sides of said attachment frame pivotally connected with upper portions of said arch on a horizontal axis extending transversely of said side members, and means for sustaining said attachment frame, upon rearward separation of said tractor therefrom, in substantially the same elevated position above the ground in which it is sustained by said tractor, said means including a pair of ground-engaging props intermediate said front and rear wheels of said tractor, respectively associated with said side members and spaced from each other transversely of the tractor a sufficient distance to permit unobstructed passage of said front wheels therebetween during movements of said tractor from and into the space between said side members.

7. In an attachment for tractors, a frame comprising side members adapted to extend longitudinally of a tractor at opposite sides thereof, and forward and rearward end portions engageable, respectively, with forward and rearward portions of said tractor for sustaining said frame in an elevated position above the ground; a pair of ground engaging props, one under each of said side members, supporting said frame for forward and rearward tilting movements from said elevated position; and an arm structure pivotally connected with a portion of said frame at one side of the tilting support afforded by said props and adapted to engage the ground at the other side of said tilting support while said frame is being sustained in said elevated position.

8. In an attachment for tractors, a frame comprising side members adapted to extend longitudinally of a tractor at opposite sides thereof, and forward and rearward end portions engageable, respectively, with forward and rearward portions of said tractor for sustaining said frame in an elevated position above the ground; a pair of ground engaging props associated, respectively, with said side members and tiltable about their lower ends to support said frame for forward and rearward tilting movements from said elevated position, each of said props having forward and rearward load bearing contact with its associated side member at portions of the latter intermediate said forward and rearward end portions of said frame; and an arm structure pivotally connected with a portion of said frame at one side of the tilting support afforded by said props and adapted to engage the ground at the other side of said tilting support while said frame is being sustained in said elevated position.

LEIF ERICKSON.